(12) United States Patent
Burdick et al.

(10) Patent No.: US 8,788,343 B2
(45) Date of Patent: Jul. 22, 2014

(54) PRICE DETERMINATION AND INVENTORY ALLOCATION BASED ON SPOT AND FUTURES MARKETS IN FUTURE SITE CHANNELS FOR ONLINE ADVERTISING

(75) Inventors: Brian Burdick, Bellevue, WA (US);
Yusuf I. Mehdi, Mercer Island, WA (US); Tarek Najm, Kirkland, WA (US); Ewa Dominowska, Kirkland, WA (US); Jody D. Biggs, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1031 days.

(21) Appl. No.: 11/675,343

(22) Filed: Feb. 15, 2007

(65) Prior Publication Data
US 2008/0103895 A1 May 1, 2008

Related U.S. Application Data

(60) Provisional application No. 60/862,969, filed on Oct. 25, 2006.

(51) Int. Cl.
*G06Q 30/00* (2012.01)

(52) U.S. Cl.
USPC .............. 705/14.69; 705/14.71; 705/14.4; 705/14.43; 705/14.46; 705/27

(58) Field of Classification Search
USPC ........... 705/14, 14.69, 27, 14.71, 14.4, 14.43, 705/14.46
See application file for complete search history.

(56) References Cited

U.S. PATENT DOCUMENTS

| | | | |
|---|---|---|---|
| 5,794,210 A | 8/1998 | Goldhaber et al. | |
| 5,855,008 A | 12/1998 | Goldhaber et al. | |
| 5,999,975 A | 12/1999 | Kittaka et al. | |
| 6,036,601 A | 3/2000 | Heckel | |
| 6,134,532 A | 10/2000 | Lazarus et al. | |
| 6,286,005 B1 | 9/2001 | Cannon | |
| 6,324,519 B1 | 11/2001 | Eldering | |
| 6,487,538 B1 * | 11/2002 | Gupta et al. | 705/14.66 |
| 6,808,173 B2 | 10/2004 | Snow | |

(Continued)

FOREIGN PATENT DOCUMENTS

| EP | 1209600 A1 | 5/2002 |
|---|---|---|
| KR | 1020020012326 A | 2/2002 |

(Continued)

OTHER PUBLICATIONS

Haring. "The Virtual Location of E-Tailers: Evidence from a B2C E-Commerce Market" (2005) ZEW (Centre for European Economic Research) Discussion Paper No. 05-52, 26 pages.

(Continued)

*Primary Examiner* — Luis A. Brown
(74) *Attorney, Agent, or Firm* — Joann Dewey; Doug Barker; Micky Minhas

(57) ABSTRACT

The claimed subject matter provides a system and/or a method that facilitates establishing a true market value for an online advertisement. An interface component can receive data related to at least one of a spot market or a future market. A dynamic pricing component can dynamically establish an ad price for an ad unit based on the spot market and the future market, the ad price reflects a market value of the ad unit in accordance with the spot market and the future market.

17 Claims, 12 Drawing Sheets

(56) References Cited

U.S. PATENT DOCUMENTS

| | | | |
|---|---|---|---|
| 7,050,990 B1 | 5/2006 | Chu et al. | |
| 7,222,099 B2 | 5/2007 | Forsythe et al. | |
| 7,496,943 B1 | 2/2009 | Goldberg et al. | |
| 7,577,582 B1 | 8/2009 | Ojha et al. | |
| 7,630,986 B1 | 12/2009 | Herz | |
| 7,657,626 B1 | 2/2010 | Zwicky | |
| 7,680,715 B2 | 3/2010 | Waelbroeck et al. | |
| 2001/0020236 A1 | 9/2001 | Cannon | |
| 2001/0047297 A1 | 11/2001 | Wen | |
| 2002/0013167 A1 | 1/2002 | Spaur et al. | |
| 2002/0049667 A1 | 4/2002 | Navani | |
| 2002/0062248 A1 | 5/2002 | Sakurai | |
| 2002/0082983 A1 | 6/2002 | Oshiba et al. | |
| 2002/0107779 A1 | 8/2002 | Maltzman | |
| 2002/0116302 A1 | 8/2002 | Wilmes et al. | |
| 2002/0188487 A1* | 12/2002 | Fox | 705/7 |
| 2003/0036975 A1 | 2/2003 | Martin et al. | |
| 2003/0135460 A1 | 7/2003 | Talegon | |
| 2003/0149975 A1 | 8/2003 | Eldering | |
| 2003/0182413 A1 | 9/2003 | Allen et al. | |
| 2004/0103024 A1 | 5/2004 | Patel et al. | |
| 2004/0128224 A1 | 7/2004 | Dabney et al. | |
| 2004/0148222 A1 | 7/2004 | Sabella et al. | |
| 2004/0254853 A1 | 12/2004 | Heene et al. | |
| 2005/0021441 A1* | 1/2005 | Flake et al. | 705/37 |
| 2005/0027594 A1 | 2/2005 | Yasnovsky et al. | |
| 2005/0043998 A1 | 2/2005 | Bross et al. | |
| 2005/0065844 A1 | 3/2005 | Raj et al. | |
| 2005/0097024 A1 | 5/2005 | Rainey et al. | |
| 2005/0097204 A1 | 5/2005 | Horowitz et al. | |
| 2005/0119934 A1 | 6/2005 | Kamiyama | |
| 2005/0144068 A1* | 6/2005 | Calabria et al. | 705/14 |
| 2005/0148377 A1 | 7/2005 | Goldberg et al. | |
| 2005/0177431 A1 | 8/2005 | Willis et al. | |
| 2005/0222865 A1* | 10/2005 | Fox | 705/1 |
| 2005/0246231 A1 | 11/2005 | Shkedi | |
| 2005/0289005 A1 | 12/2005 | Ferber | |
| 2006/0004633 A1 | 1/2006 | Ashbaugh | |
| 2006/0026061 A1 | 2/2006 | Collins | |
| 2006/0041480 A1 | 2/2006 | Briggs | |
| 2006/0041500 A1 | 2/2006 | Diana | |
| 2006/0080171 A1* | 4/2006 | Jardins et al. | 705/14 |
| 2006/0122879 A1 | 6/2006 | O'Kelly | |
| 2006/0155597 A1 | 7/2006 | Gleason | |
| 2006/0155638 A1 | 7/2006 | de la Motte | |
| 2006/0161553 A1 | 7/2006 | Woo | |
| 2006/0173744 A1 | 8/2006 | Kandasamy et al. | |
| 2006/0174170 A1 | 8/2006 | Garland | |
| 2006/0212350 A1 | 9/2006 | Ellis et al. | |
| 2006/0248035 A1 | 11/2006 | Gendler et al. | |
| 2006/0271389 A1 | 11/2006 | Goodman et al. | |
| 2006/0271425 A1 | 11/2006 | Goodman et al. | |
| 2006/0271429 A1 | 11/2006 | Borgs et al. | |
| 2006/0271438 A1 | 11/2006 | Shotland et al. | |
| 2007/0011050 A1 | 1/2007 | Klopf et al. | |
| 2007/0027753 A1 | 2/2007 | Collins | |
| 2007/0027771 A1 | 2/2007 | Collins et al. | |
| 2007/0027772 A1 | 2/2007 | Chou | |
| 2007/0033107 A1 | 2/2007 | Ubale et al. | |
| 2007/0038516 A1 | 2/2007 | Apple et al. | |
| 2007/0050254 A1* | 3/2007 | Driscoll | 705/14 |
| 2007/0061204 A1 | 3/2007 | Ellis et al. | |
| 2007/0067297 A1 | 3/2007 | Kublickis | |
| 2007/0100708 A1 | 5/2007 | Smith et al. | |
| 2007/0130005 A1 | 6/2007 | Jaschke | |
| 2007/0130009 A1* | 6/2007 | Steelberg et al. | 705/14 |
| 2007/0143186 A1 | 6/2007 | Apple et al. | |
| 2007/0150387 A1 | 6/2007 | Seubert et al. | |
| 2007/0179849 A1 | 8/2007 | Jain | |
| 2007/0192190 A1 | 8/2007 | Granville | |
| 2007/0192356 A1 | 8/2007 | O'Kelley et al. | |
| 2007/0198350 A1 | 8/2007 | O'Kelley et al. | |
| 2007/0198597 A1 | 8/2007 | Betz et al. | |
| 2007/0199017 A1 | 8/2007 | Cozen et al. | |
| 2007/0214045 A1* | 9/2007 | Subramanian et al. | 705/14 |
| 2007/0239535 A1 | 10/2007 | Koran et al. | |
| 2007/0239560 A1 | 10/2007 | McGuire | |
| 2007/0244760 A1 | 10/2007 | Bodnar et al. | |
| 2007/0260520 A1 | 11/2007 | Jha et al. | |
| 2007/0260596 A1 | 11/2007 | Koran et al. | |
| 2007/0271145 A1 | 11/2007 | Vest | |
| 2007/0276800 A1 | 11/2007 | Lee | |
| 2007/0288350 A1* | 12/2007 | Bykowsky | 705/37 |
| 2008/0004990 A1* | 1/2008 | Flake et al. | 705/27 |
| 2008/0033776 A1 | 2/2008 | Marchese | |
| 2008/0097829 A1 | 4/2008 | Ritter | |
| 2008/0147487 A1 | 6/2008 | Hirshberg | |
| 2008/0154784 A1* | 6/2008 | Veeraraghavan | 705/80 |
| 2009/0198684 A1 | 8/2009 | Collins et al. | |

FOREIGN PATENT DOCUMENTS

| | | | | |
|---|---|---|---|---|
| KR | 1020020067941 | A | 8/2002 | |
| WO | 0024484 | A1 | 5/2000 | |
| WO | WO0042593 | A1 | 7/2000 | |
| WO | WO0140893 | A2 | 6/2001 | |
| WO | 2004114083 | A2 | 12/2004 | |
| WO | 2006110873 | A2 | 10/2006 | |
| WO | 2007047310 | A2 | 4/2007 | |
| WO | WO2008002553 | A2 * | 1/2008 | G06Q 30/00 |

OTHER PUBLICATIONS

Madani, et al. "Contextual Recommender Problems" (2005) ACM, pp. 86-89.
International Search Report dated Feb. 12, 2008 for PCT Application Serial No. PCT/US2007/081840, 3 Pages.
Bjorn Knutsson. Peer-to-Peer Support for Massively Multiplayer Games. Jul. 4, 2004. http://www.cs.ualberta.ca/~anup/Courses/604/Presentation_files/Lihang/P2Pgames_Infocom04_Upenns.pdf.
Monty Giaveli. Connect 2.01. Sep. 5, 2005. http://www.allworldsoft.com/software/4-906-connect.htm.
Lan Zhao, et al., "A network modeling approach for the optimization of Internet-based advertising strategies and pricing with a quantitative explanation of two paradoxes", Aug. 31, 2007, 2 pages. http://portal.acm.org/citation.cfm?id=1188190.
Bae, et al. "The Profitability of Index Futures Arbitrage: Evidence from Bid-Ask Quotes," http://home.ust.hk/~kachan/research/arbitrage.pdf, May 1998, 32 pages.
"Index-Futures Arbitrage and the Behavior of Stock Index Futures Prices," http://press.princeton.edu/books/lo/chapt11.pdf, last accessed Apr. 4, 2007.
"Arbitage Opportunities, Brokerage, Finance businesses, miscellaneous," http://www.experienced-people.co.uk/1042-top-ways-of-making-money-online/5-last-but-not-least.htm, last accessed Apr. 4, 2007.
OA Dated Dec. 24, 2008 for U.S. Appl. No. 11/753,790, 30 pages.
OA Dated Dec. 31, 2008 for U.S. Appl. No. 11/735,753, 35 pages.
OA dated Feb. 5, 2009 for U.S. Appl. No. 11/747,963, 34 pages.
OA dated Dec. 31, 2008 for U.S. Appl. No. 11/735,753—35 pages.
OA dated Nov. 24, 2009 for U.S. Appl. No. 11/762,632—17 pages.
OA dated Nov. 24, 2009 for U.S. Appl. No. 11/742,199—16 pages.
OA dated Nov. 24, 2009 for U.S. Appl. No. 11/735,742—18 pages.
OA dated Dec. 7, 2009 for U.S. Appl. No. 11/864,481 18 pages.
OA dated Dec. 10, 2009 for U.S. Appl. No. 11/748,333 14 pages.
Final OA dated Dec. 24, 2009 for U.S. Appl. No. 11/747,968 15 pages.
OA dated Nov. 24, 2009 for U.S. Appl. No. 11/735,737 16 pages.
Notice of Allowance dated Jan. 15, 2010 for U.S. Appl. No. 11/747,963 25 pages.
OA dated Jan. 29, 2010 for U.S. Appl. No. 11/753,790 15 pages.
Final OA dated Dec. 4-12, 2010 for U.S. Appl. No. 11/735,753.
Final OA dated dated Dec. 5-25, 2010 for U.S. Appl. No. 11/735,737.
Final OA dated dated Dec. 5-12, 2010 for U.S. Appl. No. 11/735,742.
Final OA dated Dec. 6-21, 2010 for U.S. Appl. No. 11/742,199.
NF OA dated Dec. 6-24, 2010 for U.S. Appl. No. 11/762,632.
Final OA dated Dec. 6-8, 2010 for U.S. Appl. No. 11/748,333.
NF OA dated Dec. 5-26, 2010 for U.S. Appl. No. 11/864,481.
First OA dated Dec. 6-8, 2010 for U.S. Appl. No. 11/763,542.

(56) References Cited

OTHER PUBLICATIONS

First OA dated Dec. 5-11, 2010 for U.S. Appl. No. 11/753,784.
Final OA dated Dec. 4-8, 2010 for U.S. Appl. No. 11/762,625.
Final OA dated Dec. 4-12, 2010 for U.S. Appl. No. 11/762,243.
NF OA dated Dec. 4-13, 2010 for U.S. Appl. No. 11/747,968.
OA dated Dec. 8-16, 2010 for U.S. Appl. No. 11/753,790.
Final Office Action dated Nov. 8, 2010 for U.S. Appl. No. 11/753,784.
Final Office Action dated Nov. 23, 2010 for U.S. Appl. No. 11/762,632.
Final Office Action dated Oct. 27, 2010 for U.S. Appl. No. 11/747,968.
Final Office Action dated Oct. 27, 2010 for U.S. Appl. No. 11/735,753.
FOA dated Dec. 7, 2010 for U.S. Appl. No. 11/864,481.
FOA dated Dec. 22, 2010 for U.S. Appl. No. 11/763,542.
FOA dated Feb. 2, 2011 for U.S. Appl. No. 11/753,790.

* cited by examiner

PRICE DETERMINATION AND INVENTORY ALLOCATION BASED ON SPOT AND FUTURES MARKETS IN FUTURE SITE CHANNELS FOR ONLINE ADVERTISING

CROSS REFERENCE TO RELATED APPLICATION(S)

This application claims the benefit of U.S. Provisional Application Ser. No. 60/862,969 filed on Oct. 25, 2006, entitled "DISTRIBUTED ARCHITECTURES FOR ONLINE ADVERTISING." The entirety of the aforementioned application is incorporated herein by reference.

BACKGROUND

Merchants today typically utilize some form of online advertising to augment at least part of their business transactions. This can range from advertising on websites to hosting their own websites, complete with shopping mechanisms and transaction processing systems. Although having a web site totally dedicated to a single merchant is great for providing in-depth product information and services, customers must still find the website before they can decide to make a purchase. To draw customers to their sites, merchants often advertise online in locations they feel will bring the most interested customers to their sites. Key advertisement locations and/or positions tend to be located near the top portion of a website and/or web page, which often catch the attention of web-surfers, users, clients, customers, etc. In general, most websites and/or web pages implement some form of advertisement in order to maximize the potential profit from such web space. Furthermore, advertisements are most valuable in places commonly visited by users, for example, some form of a search engine site. Thus, advertising on search engine pages has become quite popular with merchants.

Historically, large web search engines have sold advertising space based on keyword-driven search results. For example, a first website can employ an advertising space selling technique that conducts auctions for certain keywords, and the highest bidder(s) can have their ads placed on pages containing search results from the first website, or they obtain preferred placement among the search results (e.g., at the top of the results list). By providing advertisements based on a specific keyword search, an advertiser is able to target a particular audience of specific portions and/or size which optimizes the advertisement campaign.

As web advertising develops, a number of companies are now acquiring large publisher bases from which they can sell advertisements. In particular, a search engine company can sign up publishers into an ad network, wherein advertisers can pay the search engine company to serve advertisements to participants of the ad network. The search engine company can then pay a portion or all of the advertising revenue to the individual publishers. For example, a publisher in the ad network may have an article on its website that talks about digital cameras, and the ad network would display digital camera advertisements from advertisers in the ad network on that particular website. The search engine company would auction off the "digital camera" keyword to advertisers in its ad network and display ads from the highest bidder(s) or ads that are most likely to generate highest expectation of revenue.

By way of further background, there are two conventional classes of online ads sales mechanisms. A first technique of sale of ads is where an ad network uses dynamic auction to distribute ads on publishers' sites. This model most often is based on the advertisers' willingness to pay on a per click of their ad basis from selected keywords, site matching, and/or category matching attributes offered by the ad network. A second, alternative technique of sales ads is where an ad network guarantees advertisers a certain amount of displays of ads on publishers sites upfront at a set rate that the advertiser buys or not. Such traditional techniques are cumbersome, inefficient, and overall inaccurate for establishing the worth related to online ad space and they are hard to compare.

There are a number of problems with this proprietary ad network model. First, companies that are building ad networks have an inherent conflict of interest because they represent both the publisher and the advertiser. Second, because there are multiple companies that are creating ad networks, advertisers have the burden of managing buys across many ad networks, which results in significant cost and complexity to the advertiser. Third, because publishers are for all practical purposes locked into a single ad network, the advertiser competition is limited, which results in lower return for the publishers. Fourth, the lack of general standards around terms and conditions, and behavioral segmentation is a major obstacle to reaching the full market value of online display advertising. There is also no current standardization across publishers for accepted media types and ad formats. Fifth, smaller publishers currently have very little power individually, even if they serve a hard-to-reach audience. Finally, ISPs and other owners of large user databases are not realizing the full value of the information they have due to privacy concerns and lack of a proper marketplace.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate maintaining at least one spot market and at least one guaranteed/future market in accordance with establishing an ad price. A dynamic pricing component can evaluate data associated with at least one market (e.g., a spot market, a future market, a guaranteed market, etc.) in order to generate an ad price for a potential ad unit which is representative of a market value, market price, and/or fair market price/value for such potential ad unit. In particular, the dynamic pricing component can establish an ad price for the guaranteed/future market in real-time by evaluating a spot market price. Furthermore, the dynamic pricing component can dynamically identify an ad price for the spot market by monitoring a future/guaranteed market price.

By utilizing the markets (e.g., the spot market, the future market, the guaranteed market, etc.), the ad price can depict a fair market value and/or accurate price that correlates to the demand related to the advertising market. In relation to the spot market, the dynamic pricing component can evaluate the settled price and/or negotiated price in the future/guaranteed market, wherein such settled price can be employed as a starting price in the spot market. On the other hand, the dynamic pricing component can monitor the starting/ending price (e.g., opening bid) in the spot market in order to implement such ending price as a negotiated and/or set price for the future/guaranteed market. Furthermore, the dynamic pricing component enables most any suitable potential ad unit to be sold irregardless of characteristics such as, but not limited to, duration, amount, price, measurement associated with price (e.g., a fractional rotation for an ad placement, a cost/price per click (CPC), a price per 1000 impressions (CPM), a price per N impression (where N is a positive integer), etc.), position of ad unit, location of ad unit, grouping of ad unit, webpage origin, website origin, number of ad units, etc. In other aspects of the claimed subject matter, methods are provided that facilitates evaluating at least one market to identify a starting price for the purchase of an advertisement.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
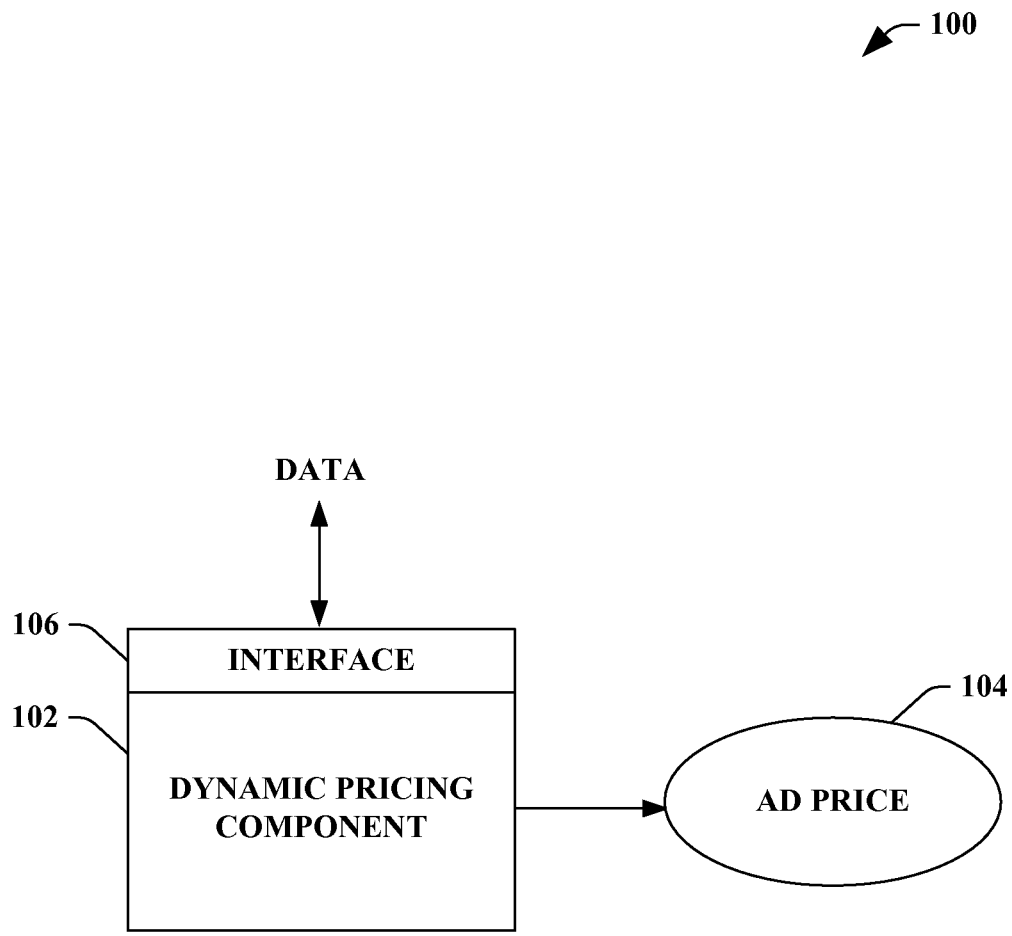
FIG. 1 illustrates a block diagram of an exemplary system that facilitates establishing an ad price consistent with at least one market demand.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "market," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates establishing an ad price consistent with at least one market demand. The system 100 can include a dynamic pricing component 102 that can receive data via an interface component 106, wherein the dynamic pricing component 102 generates an ad price 104 based at least in part upon the received data. In particular, the received data can be related to at least one market related to the sale of a portion of an advertisement (discussed below). Thus, the dynamic pricing component 102 can identify a price for a portion of an advertisement such that the price is an accurate representative of the market value and/or a market price associated therewith. For example, conventional techniques and/or mechanisms to calculate a price for a portion of an advertisement are inefficient, inaccurate, and/or unreliable. By evaluating at least one market associated with the sale of a portion of an advertisement, the dynamic pricing component 102 can identify a fair market value and/or market price associated with the advertisement in real-time to efficiently sell a portion of the ad in at least one of a spot market or a futures/guaranteed market (discussed in more detail in FIG. 2).

It is to be appreciated that the ad price 104 can be a price related to most any suitable portion of an ad unit (e.g., also referred to as advertising unit). The subject innovation is intended to include most any suitable and/or potential ad unit utilized by a publisher, wherein an ad unit can be a specific location on a page and/or website that an ad can be rendered. In other words, the potential ad unit can relate to a website, webpage, RSS stream etc. that can be sold to advertise a particular item, good, service, a disparate ad, any suitable entity related to commerce, and/or any suitable combination thereof Furthermore, the ad price 104 can relate to most any suitable amount, group, bundle, and/or number of the potential ad units. For example, a publisher can sell a percentage of potential ad unit(s) displays and/or a fixed amount of such potential ad unit(s) displays. Still further, the potential ad unit can relate to most any suitable position on the website, webpage, page, etc. For instance, typical techniques refer to a position 1 as an upper-echelon location for an ad (e.g., a location at a top portion, a top-most portion, etc.). However, it is to be appreciated that the particular location of an ad can be most any suitable location and the claimed subject matter is intended to include various positions for the ads. Accordingly, each ad with respective position can include a particular price ascertained by the dynamic pricing component 102 (discussed in more detail infra and FIG. 8).

Additionally, the dynamic pricing component 102 can implement most any suitable measurement related to the advertising industry that can assist in estimating traffic related to the particular portion of advertisement to which a price is to be generated. Specifically, the dynamic pricing component 102 can provide a fractional rotation for the advertisement, a cost/price per click (CPC), a price per 1000 impressions (CPM), a price per N impression (where N is a positive integer), and/or most any suitable unit of measurement related to the sale of a portion of a potential ad unit. For example, the dynamic pricing component 102 can dynamically identify a particular price for a potential ad unit, wherein the price is based on a fractional rotation of such potential ad unit. Moreover, in a disparate example, the dynamic pricing component 102 can establish the ad price 104 based upon the received data such that the price relates to a cost per click (CPC).

For example, the dynamic pricing component 102 can receive data related to a spot market and a future/guaranteed market in order to establish the ad price 104. In particular, the spot market data can be utilized to identify a suitable ad price 104 for the future/guaranteed market and vice versa. In other words, the dynamic pricing component 102 can combine a continuous auction (e.g., a spot market) with a fixed contract negotiation (e.g., a guaranteed/futures market) in order to generate the ad price 104 consistent with the current market and/or demand associated with the particular portion of advertisement. By utilizing a spot market with a future/guaranteed market to establish the ad price 104 and vice versa (e.g., utilizing a future/guaranteed market to establish the ad price 104), the portion of advertisement and/or potential ad unit can be sold with an accurate depiction of the true value within the market in real-time.

Moreover, the system 100 can include any suitable and/or necessary interface component 106 (herein referred to as "interface 106"), which provides various adapters, connectors, channels, communication paths, etc. to integrate the dynamic pricing component 102 into virtually any operating and/or database system(s). In addition, the interface 106 can provide various adapters, connectors, channels, communication paths, etc., that provide for interaction with the dynamic pricing component 102, most any suitable market, the ad price 104, and/or to receive most any suitable data related to the system 100 in order to establish the ad price 104.

Figure 2:
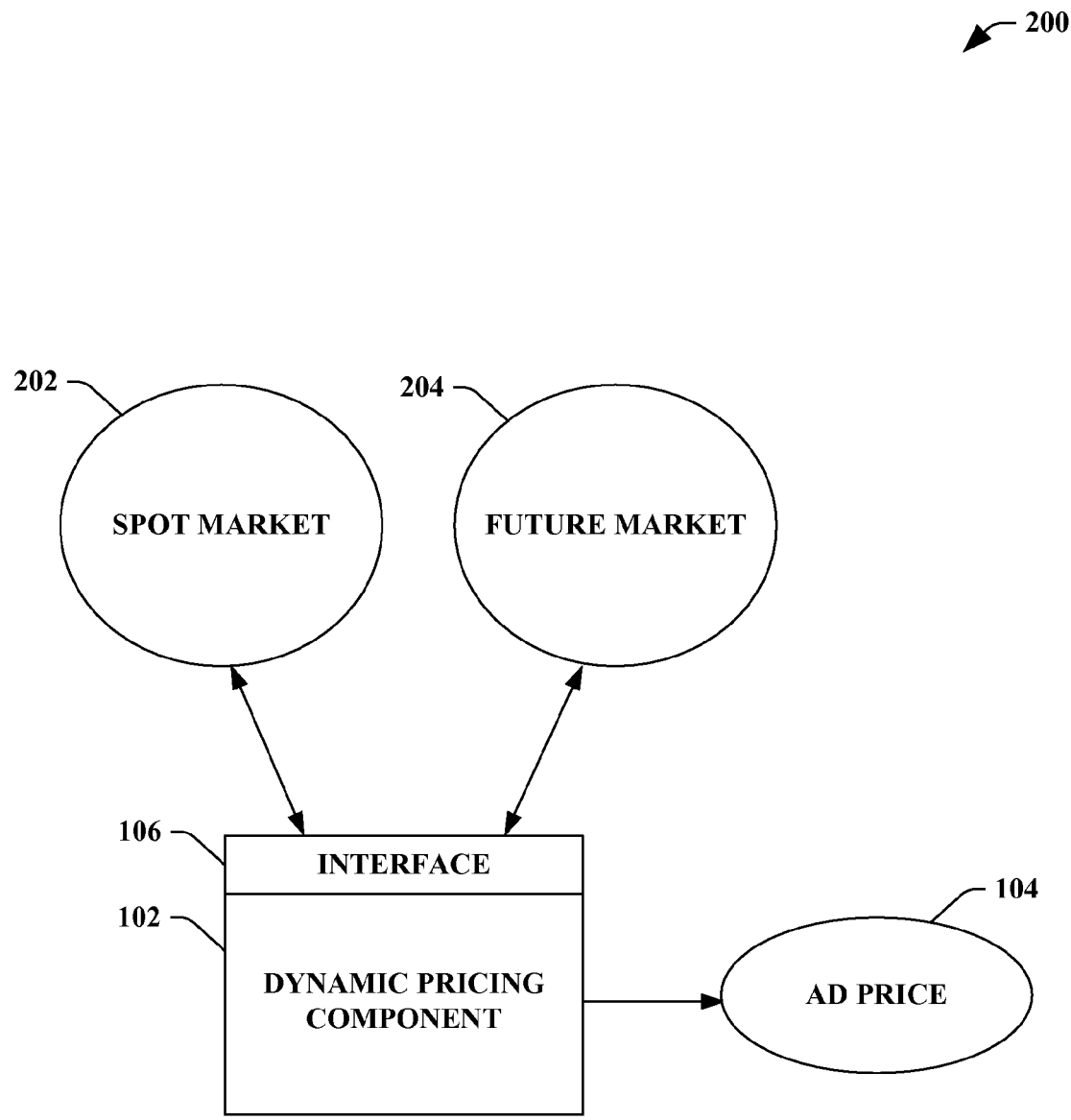
FIG. 2 illustrates a block diagram of an exemplary system that facilitates evaluating at least one market to identify a starting price for the purchase of an advertisement.

FIG. 2 illustrates a system 200 that facilitates evaluating at least one market to identify a starting price for the purchase of an advertisement. The system 200 can include the dynamic pricing component 102 that can receive data associated with a spot market 202 and a future market 204 (e.g., also referred to as a guaranteed market) in order to ascertain the ad price 104 to which a portion of a potential ad unit can be sold in accordance with at least one of the markets. By evaluating and/or receiving data associated with the spot market 202 and the future market 204, the generated ad price 104 can be an accurate depiction of the true and/or fair market value and/or price of the portion of the potential ad unit.

In one example, the spot market 202 can be an inventory for which the price is not deterministic or predictable. Auction bidding for a product is an example of spot market inventory. In contrast, the future market 204 (also referred to as the guaranteed market) can be an inventory for which the seller is guaranteeing the conditions of sale, potentially at a lower price, for the certainty offered by the immediate sale of the item to the customer. In this regard, as another downside to conventional advertising purchasing processes, the spot market inventory are sold according to one set of processes, and future/guaranteed market inventory are sold according to independent, other processes. In other words, typical processes for purchasing spot advertising inventory are separated from the processes for purchasing guaranteed advertising inventory. However, the system 200 combines the two techniques by evaluating and/or receiving data from the spot market 202 and the future market 204 in order to ascertain and/or identify the ad price 104 consistent with at least one of such markets.

It is to be further appreciated that the system 200 can be implemented in a peer-to-peer architecture, wherein processing performed by the exchange of the claimed subject matter is shared across multiple participating machines. In such a non-limiting embodiment, each machine participating in the exchange network enabled by the system 200 can share some of the processing associated with normalization or content matching processes performed by the various embodiments of the on-line exchange of the system 200.

Figure 3:
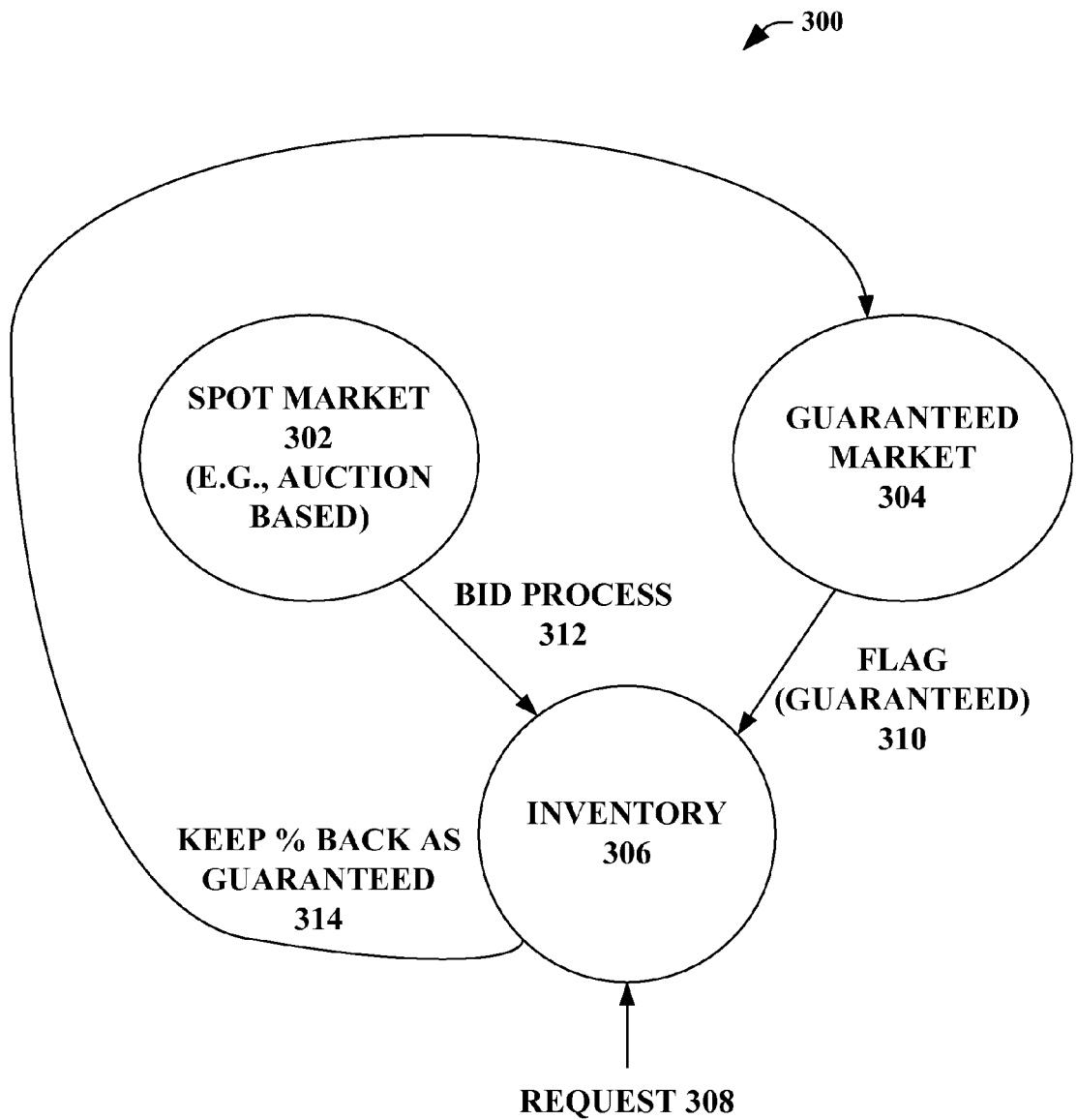
FIG. 3 illustrates a block diagram of an exemplary system that facilitates maintaining at least one spot market and at least one guaranteed/future market in accordance with establishing an ad price.

FIG. 3 illustrates a system 300 that facilitates maintaining at least one spot market and at least one guaranteed/future market in accordance with establishing an ad price. Accordingly, the exchange of the subject innovation optionally includes the ability to intermix two classes of inventory (e.g., spot market inventory and guaranteed/future market inventory) simultaneously in the same purchasing process. As shown, FIG. 3 illustrates the system 300 which is another exemplary, non-limiting embodiment of the claimed subject matter in which the two classes of inventory are intermixed as part of a purchasing process. For instance, at 308, a request is made for inventory 306. In accordance with the presently described embodiment, inventory 306 can be apportioned among spot market 302 and guaranteed market 304 (as designated, for example, by flag 310). In satisfaction of request 308, the potential purchaser is thus provided with the ability to make a purchase of an advertising product either via an auction bid process 312 for spot market inventory 302, or via a guaranteed purchase price with respect to guaranteed market 304. In accordance with the subject innovation, a percentage of the inventory 306 can be held back at 314 as guaranteed inventory 304 since purchasers subsequent purchasing decisions will end up rationally informing the pricing model that should be applied for inventory 306 in general. The exchange related to the system 300 can intermix unpredictable and predictable pricing models, and allows one to inform the pricing model for the other, and vice versa.

Accordingly in exemplary non-limiting implementation, the claimed subject matter includes the ability to have both an online auction for price per click ads running continuously while allowing publishers the ability to sell some inventory at a fixed rate concurrently. A disparate part of this innovation is directly allowing small publishers to set the price of the fixed rate and the percentage of traffic for certain pages on their site up-front, giving control to advertisers in a way they have not enjoyed before.

In an exemplary non-limiting implementation of such a system, self-serve percent rotation of future site channels for online advertising is enabled. The rotation would work by having a continuous contextual auction, but allowing publishers to group pages together and sell a potential ad unit at a pre-selected/identified measurement (e.g., fractional rotation, pre-defined CPM, a pre-defined set of time, a pre-defined display position, etc.) on a website, webpage, page, etc. For example, the publisher can offer a fractional rotation. Once the publisher offers this fractional rotation for a discrete amount of time on a set of pages in specific placement, advertisers have the ability to purchase the fractional rotation at the rate specified or a secondary auction can be held on a per percentage point basis (or most any suitable measurement).

In one example, the claimed subject matter thus provides the ability to offer a percentage based "Buy It Now" kind of sale of ads with the simultaneous continuous online auctions for other ads. In addition, if this feature were to be introduced into software advertising platform, such as but not limiting to, Adcenter for Paid Search, it can be implemented in the following non-limiting ways: (1) Fixed Position CPM Pricing for Fractional Rotation for a Particular Position; (2) Adjustable Duration for Initial Market Uptake; (3) Setting the Price Related to the Future Market; and/or (4) Non-resalable Futures Contracts.

While exemplary embodiments of the system 300 that utilize advertising platform software can be described herein with respect to Adcenter, it can be appreciated that the use of Adcenter is for illustrative purposes only, and any advertising platform software may be utilized. In other words, the claimed subject matter can be utilized with most any suitable hardware, software, and/or combination thereof that relates to a portion of an advertising platform software. For example, the claimed innovation can be a plug-in, a stand-alone software, an upgrade, and/or most any suitable combination thereof.

For "Fixed Position CPM Pricing for Fractional Rotation for a Particular Position," advertisers are allowed to bid on a percentage of traffic for an exact match of a keyword in the particular position (e.g., position 1). Position 1 would then necessarily have discrete pricing and contracts. Finally, since the position is fixed, CPC pricing becomes irrelevant and introduces additional risk to an advertising platform product versus CPM based pricing—therefore, a CPM based futures contract is recommended. A potential downside is that advertisers may already know how to value their CPC based contracts and not CPM based contracts—however, a number of large agencies and advertisers could easily determine their CPM valuations from the data they already have.

In this respect, the reason to limit bidding to position 1 is that a limited set of advertisers is present and it is desirable to both guarantee position and increase the participation to the maximum in order to derive the true value of the word, which would be used for setting of floor pricing later. Additionally, since position is being guaranteed, this has a negative impact to consumer relevance and therefore limiting it to one position will have the desired effect of yielding enough pricing information to set the generalized floor pricing without impacting relevance anymore than necessary.

The reason to allow the percentage of traffic is that it will allow advertisers to hedge some of their traffic by using the live market, while guaranteeing a substantial amount of traffic in the future at a fixed rate. Additionally, it will allow smaller consumers to bid a higher value for a smaller amount of traffic, which should increase the value of the auction. In addition, a percentage of the traffic can be held back as a reserve for doing market comparisons, etc.

For instance, for exemplary contracts for keyword: Hotel, contract 1 might be "Contract 1: Company A $100 CPM for 50% of the traffic on position 1" and contract 2 might be "Contract 2: Company B $75 CPM for 50% of the traffic on position 1."

This structure has the benefit that it can fit into existing SFS infrastructure on the order-entry and billing sides. The simplified version of this does not require rotation fraction, but rather would offer contracts on 100% of the traffic for position one for any given keyword. Moreover, the future market bidding can be for a point in time in the future which can start at most any suitable date in the future for most any suitable period of time (discussed below as the "Adjustable Duration for Initial Market Uptake"). Moreover, it is to be appreciated and understood that a fractional rotation for a particular position can be interpreted such that the ad for that position will be seen that percentage of time. The percentage base measurement can be implemented in that the value of impressions can difficult to estimate.

In relation to the above, the position 1 is solely for illustration. As previously discussed, it is to be appreciated that most any suitable position and/or location on a webpage, website, page, etc. can be subject to the sale. It is to be understood that position 1 in this example is to be considered extremely valuable as such position is typically reserved for special promotions (e.g., top-most located ad is typically seen by a user first).

With respect to "Adjustable Duration for Initial Market Uptake" (potentially one month durations if the futures program is continued in an ongoing basis), setting the duration of the future is difficult because it is desirable to guarantee the traffic for a long enough time period that advertisers will price the future contract more heavily weighted with the ultimate value of market while at the same time not locking a site into a long-term undervaluation. The future market could be set for monthly, quarterly, bi-annual, weekly, daily, hourly, by the minute, etc. terms. In one implementation, the bi-annual terms are selected, which map well to creating the correct advertiser incentive for long-term pricing without being too long term. It is to be appreciated that most any suitable duration can be implemented upon the evaluation for the particular ad and/or portion of ad and the subject innovation is not so limited to the example above. It is also possible to allow contract renewal, etc. of the futures market. In such case, the term of the futures contract may be reduced, maintained, and/or increased, e.g., possibly to a single month duration.

In other words, in a future market there is a duration (discussed in more detail below). The duration can be open but the advertiser buys for a time period but the contract can renew dynamically for each new period. The claimed subject matter includes the option of changing the price but it is set for a time and the advertiser can re-try buying such ad at the established price with a new and/or disparate timeframe. It is to be appreciated that there can be numerous factors that can vary accordingly such as, but not limiting to, the ad position, the trigger date for starting and/or ending the ad length (e.g., duration), the duration, etc. Furthermore, the claimed subject matter can include specifically tailoring the duration of a future/guaranteed market and/or contract agreement to the particular purchaser.

With respect to "Setting the Price Related to the Future Market," the claimed subject matter can include various techniques and/or mechanisms to set a price for the guaranteed/futures market. It is to be appreciated that the claimed subject matter can utilize most any suitable technique and/or mechanism to set a starting price for the guaranteed/future market such as, but not limited to, a publisher set price, a price set from a market driven approach, a Vickrey auction, an auction, a Dutch auction, a second price auction, a lottery, a mixed goods auction, most any suitable technique to ascertain a set price for the future/guaranteed market, etc. In other words, in order for the guaranteed/futures market to initiate, a set price must be established and the above are examples of establishing such set price. For example, a mixed good auction can include a bid for a particular ad location but such bid is only accepted if a corresponding percentage is met. For example, Company A can submit a bid for an ad in a position, yet such bid can be contingent upon receiving a particular percentage for such position (e.g., 50%). If such percentage cannot be met, the bid will not be taken. If the percentage is met, the bid can be accepted and the future/guaranteed market can implement such price as a set price.

In another example, a Vickrey auction (sealed-bid, second price) pricing with pre-determined close date can be utilized to drive the value of an ad contract in a future/guaranteed market. Further, the auctions can be spread out so that the auction can be broken up over the course of a few weeks. Basically, the terms can be auctioned off by alphabetical first letter with one letter being sold a day until all letters are gone, yet it is to be appreciated that the terms can be auctioned off in most any suitable manner in most any suitable timeframe. For instance, the market would open for a given letter of the alphabet at midnight PST and close at 11:59:59 24 hours later.

A benefit of such an auction is that it is outside of budget considerations and CTR uncertainties that should help it to reveal more truth. In one embodiment, keywords and ads go through editorial as soon as the offer is submitted.

The reserve price could be set for all of these auctions by looking at the global CTR (probably around 5%) and multiplying it times the bid floor CPC (usually S.05) to come up with an estimated CPI—then multiplying by 1000 to arrive at the estimated CPM. The estimated CPM price should then be doubled to account for the fixed positioning and fixed timeline of the contract.

Considering an example auction for keyword: hotel, the following three bids might be received:

Bid 1: Travel Company A $100 CPM for 50% of the traffic on position 1
Bid 2: Travel Company B $75 CPM for 100% of the traffic on position 1
Bid 3: Company C $40 CPM for 50% of the traffic on position 1

With such example bids, the result of the auction may be as follows:

Travel Company A Receives Future at $75 CPM for 50% of the traffic.
Travel Company B Receives Future at $40 CPM for 50% of the traffic.
Company C loses on their secondary bid and doesn't receive any future contract.

Furthermore, with respect to "Non-Resalable Futures Contracts," it is noted the accounting relationships for resale may include additional work. Additionally, there may be incentives for speculation in such a case, which may be a negative aspect for the market. In other words, the subject innovation can provide the terms associated with the resale of future contracts to be, but not limited to, resalable, non-resalable, contacted out, contracted in, chosen based on the buyer, selected by the seller, silent on such terms, etc. For example, a buyer can purchase inventory on a site (e.g., a portion of a potential ad unit) and resell the inventory through a disparate clearing house (discussed in more detail infra). It is to be appreciated that there can be a wholesale aspect (e.g., buy in bulk and consequently sell portions of such bulk purchase). Moreover, there can be a bundling aspect included with the claimed subject matter. For example, futures for car sites can be purchased and then can be resold and/or trade portions of a bundled ad unit(s), exchange, make payments, etc.

As previously stated, the subject innovation provides a setting of a CPC bid floor based on a result of a futures auction. For example, one approach that may be taken to set the reserve price for each keyword for the CPC keyword spot market is by using some fraction of the weighted average of auction price results for the futures CPM contracts on each keyword. In other words, the subject innovation enables interplay between most any suitable existing market (e.g., spot market, future market, guaranteed market, etc.). Thus, the claimed subject matter can inform back and forth between most any suitable existing market in order to identify an ad price for one another (e.g., utilize the spot market to identify a set price for the guaranteed market and utilize the guaranteed market to identify a starting price for the spot market).

In another embodiment of the invention, the invention further splits spot market inventory and future/reserve market inventory via an intelligent segmentation. In addition, the invention optionally enables automatic apportioning of inventory on both the spot market side and the future/reserve market. Based on volatility and risk assumptions, the claimed subject matter thus provides a technique to rationally price guaranteed inventory as future product.

Figure 4:
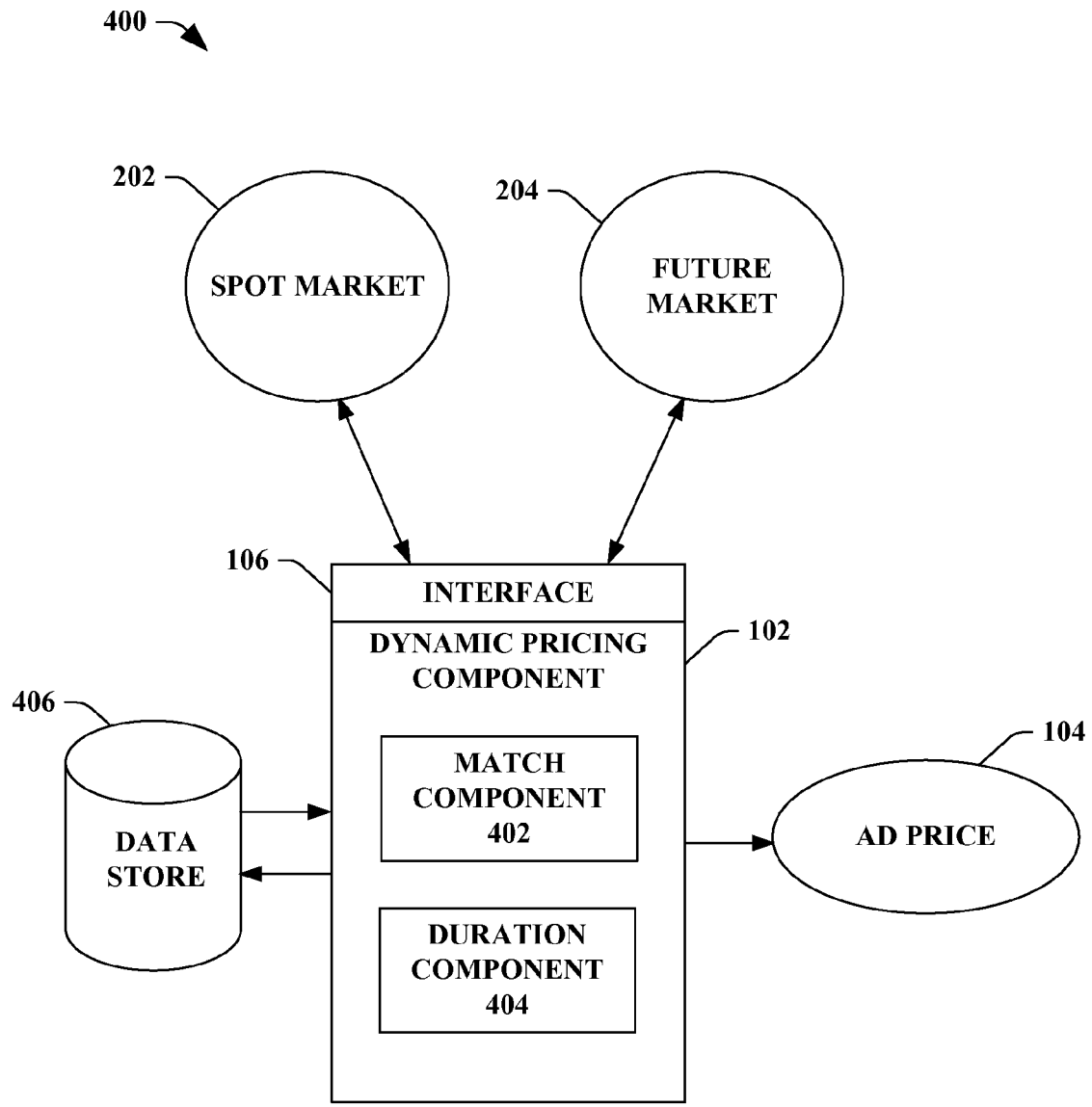
FIG. 4 illustrates a block diagram of an exemplary system that facilitates identifying ad purchase details to ensure the ad sale contract is consistent with a current state of at least one market.

FIG. 4 illustrates a system 400 that facilitates identifying ad purchase details to ensure the ad sale contract is consistent with a current state of at least one market. The system 400 can include the dynamic pricing component 102 that dynamically establishes the ad price 104 for at least one of the spot market 202 and/or the future market 204 based at least in part upon the evaluation of the future market 204 and the spot market 202 respectively. In other words, the dynamic pricing component 102 can receive data related to the spot market 202 and the future/guaranteed market 204 in order to establish the ad price 104 which is an accurate depiction of the fair and/or true market price and/or value.

The dynamic pricing component 102 can include a match component 402 that provides substantially similar characteristics and/or trends associated with prices for a particular potential ad unit(s). Thus, the match component 402 can facilitate identifying ad sales related to the spot market 202 to be implemented to ascertain prices in the future market 204. Moreover, the match component 402 can facilitate identifying ad sales related to the future market 204 to be implemented to ascertain prices in the spot market 202. For example, an ad for a first website can be sold for a specified amount in a particular position within the spot market 202. Such selling price can be utilized in the future market 204 based upon the match component 402 identifying such sell as a substantially similar transaction (e.g., position, amount, website, etc.). The match component 402 can evaluate the numerous sales associated with ads and respective characteristics in order to match such sales for comparisons which assist in determining selling prices for disparate markets.

The dynamic pricing component 102 can further include a duration component 404 that can automatically adjust a time period associated with an ad sale contract associated with the future market 204. The contract negotiations related to the ad can be for most any suitable time period such as, but not limited to, yearly, monthly, bi-annually, quarterly, weekly, daily, hourly, by the minute, and/or most any suitable partition related to time. Specifically, upon negotiating such terms (e.g., duration) related to the ad sale contract in the future market 204, circumstances surrounding such negotiations can change. Thus, the duration component 404 can automatically ascertain and/or calculate a new fair market price and/or value associated with the ad contract by keeping the previously agreed-upon duration static. Moreover, the duration component 404 can calculate a new time period and/or duration by keeping the previously agreed-upon price static. Still further, the duration component 404 can adjust at least one of the time period and/or price associated with the contract negotiation in order to ensure consistency thereof with the current state of the market (e.g., determined by the spot market 202 and/or the future market 204).

The system 400 can include a data store 406 that can store various data related to the system 400. For instance, the data store 406 can include most any suitable data related to advertising platforms such as, but not limited to, data related to the spot market 202, data related to the future market 204, data related to a market, auction data, advertising data, publisher data, advertiser data, contract negotiation data, ad data, potential ad unit data, ad position data, cost/price data, historic data related to contracts and/or auctions, most any suitable data utilized to establish a market price for potential ad unit, etc.

The data store 406 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 406 of the subject systems and methods is intended to comprise, without being limited to, these and any other suitable types of memory and/or storage. In addition, it is to be appreciated that the data store 406 can be a server, a database, a relational database, a hard drive, and the like.

Figure 5:
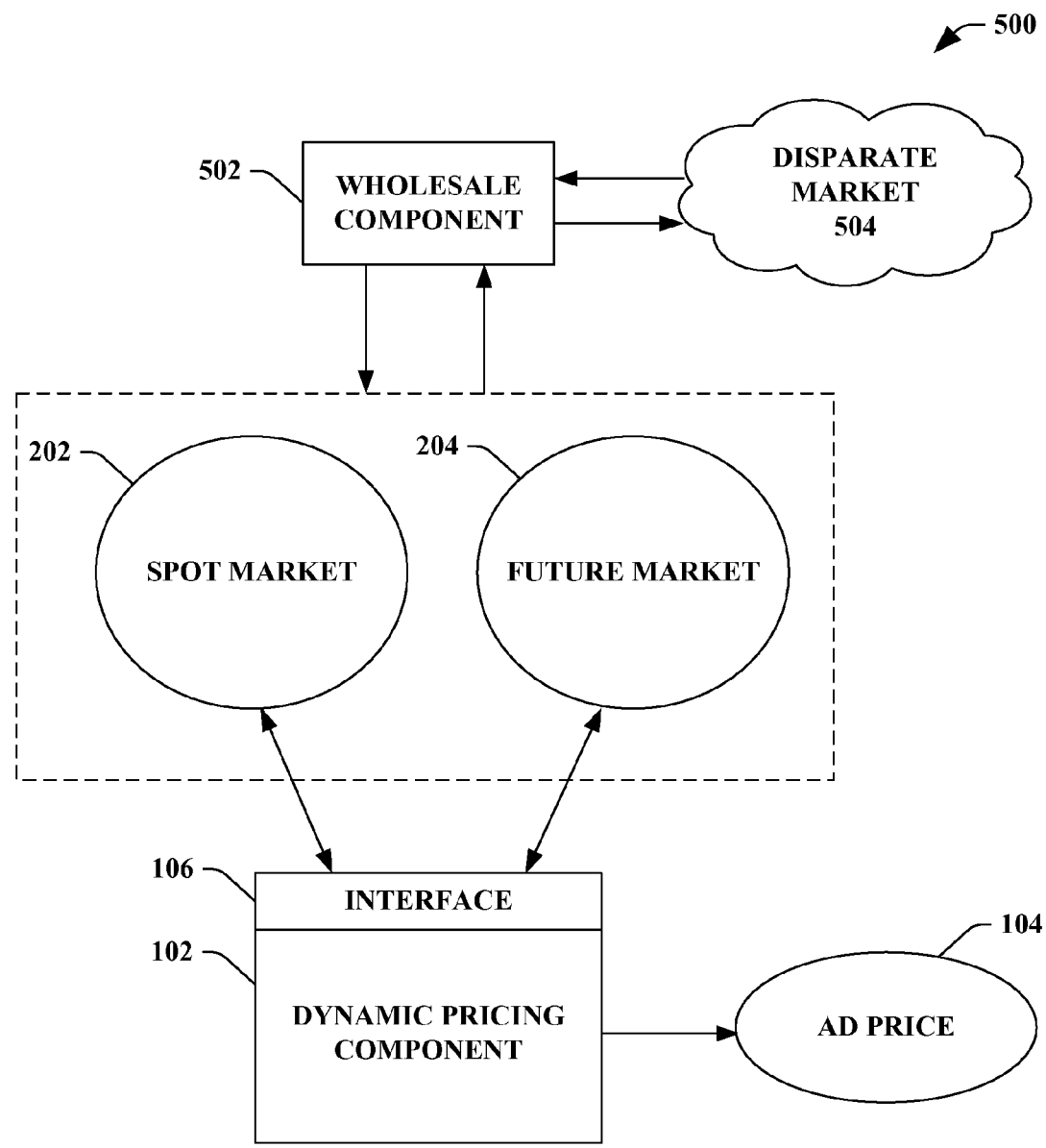
FIG. 5 illustrates a block diagram of an exemplary system that facilitates implementing a dynamic environment that enables the purchasing of an ad at a target price for distribution in a disparate market.

FIG. 5 illustrates a system 500 that facilitates implementing a dynamic environment that enables the purchasing of an ad at a target price for distribution in a disparate market. The system 500 includes the dynamic pricing component 102 that can evaluate data associated with the spot market 202 and/or the future market 204, wherein the ad price 104 can be ascertained based thereupon such evaluation. It is to be appreciated that the dynamic pricing component 102 can establish a price (e.g., a fair market price and/or value, an accurate price corresponding to demand, etc.) for a potential ad unit for the future market 204 by evaluating the spot market 202. Furthermore, the dynamic pricing component 102 can identify a price (e.g., a fair market price and/or value, an accurate price corresponding to demand, etc.) for a potential ad unit for the spot market 202 by evaluating the future market 204 (e.g., also referred to as the guaranteed market).

The system 500 can further include a wholesale component 502 that can purchase a portion of a potential ad unit at the established ad price 104 in order to re-sell at least a fraction of the portion of potential ad unit in a disparate market 504. For instance, the wholesale component 502 can purchase the potential ad unit in at least one of the spot market 202 and/or the future market 204 at the ad price 104 (ascertained by the dynamic pricing component 102), wherein the wholesale component 502 can initiate a re-sell of the purchase in the disparate market 504 with most any suitable combination, grouping, bundling, partitioning, etc. It is to be appreciated that the wholesale component 502 can implement most any suitable pricing technique and/or mechanism in order to re-sell the potential ad unit(s). For example, the wholesale component 502 can establish its own price off of the initial purchase price (e.g., the initial purchase price is a floor in order to turn a profit).

In another example, the wholesale component 502 can implement its own dynamic pricing component 102 in order to ascertain the market price and/or value. Furthermore, it is to be appreciated that although the wholesale component 502 can re-sell the potential ad unit(s) in the disparate market 504 with a disparate clearing house, the wholesale component 502 can utilize the substantially similar clearing house to sell in at least one of the spot market 202 and/or the future/guaranteed market 204. It is to be appreciated that the wholesale component 502 can be a third-party, a service, a network, a portion of a service, a server, a component, a machine, and/or any suitable combination thereof.

Figure 6:
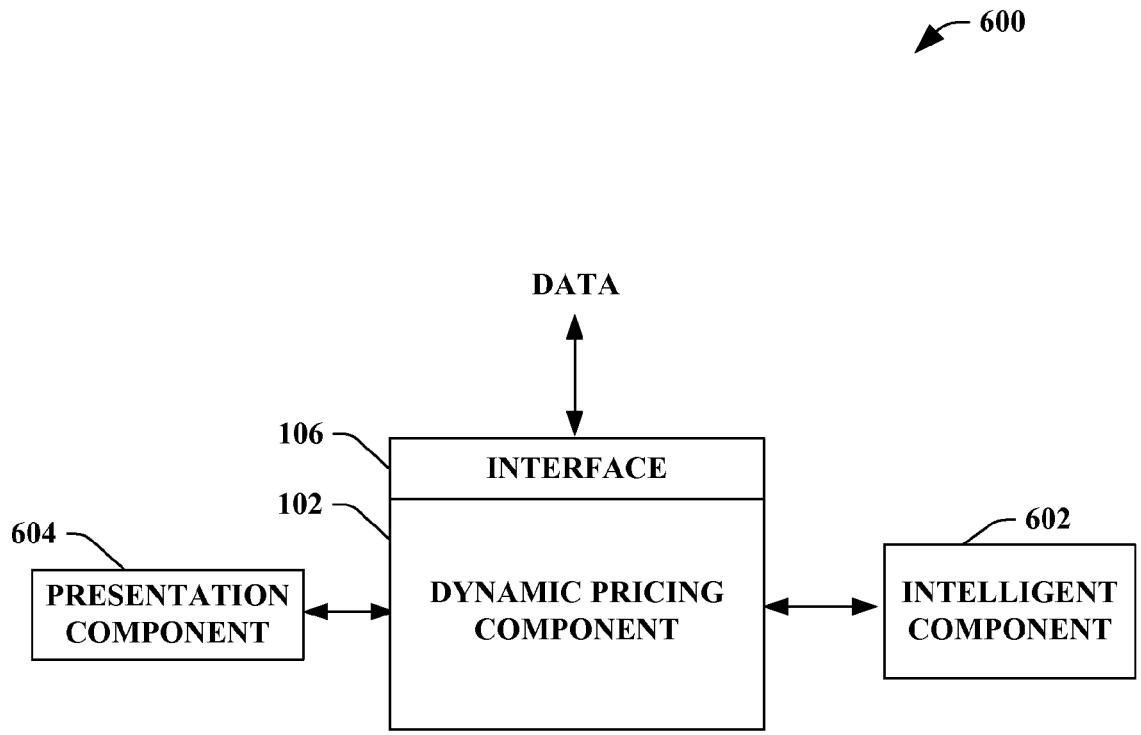
FIG. 6 illustrates a block diagram of an exemplary system that facilitates employing inference technologies in order to establish a market price to sell an ad that can dynamically adjust accordingly.

FIG. 6 illustrates a system 600 that employs intelligence to facilitate establishing a market price to sell an ad that can dynamically adjust accordingly. The system 600 can include the dynamic pricing component 102 and the interface 106 that can all be substantially similar to respective components and interfaces described in previous figures. The system 600 further includes an intelligent component 602. The intelligent component 602 can be utilized by the dynamic pricing component 102 to facilitate inferring pricing patterns and/or consistencies to be employed in establishing the ad price 104 based on evaluating the spot market 202 and the future market 204. For example, the intelligent component 602 can infer a pricing pattern, a pricing consistency, a spot market start price, a spot market end price, a future market negotiated price, an auction ending price, an auction price, an auction starting price, an ad position, a measurement associated with a potential ad unit, an ad unit to sell, a duration, a wholesale re-sell price, etc.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The dynamic pricing component 102 can further utilize a presentation component 604 that provides various types of user interfaces to facilitate interaction between a user and any component coupled to the dynamic pricing component 102 and display of collected and/or gathered real-time data. As depicted, the presentation component 604 is a separate entity that can be utilized with the dynamic pricing component 102. However, it is to be appreciated that the presentation component 604 and/or similar view components can be incorporated into the dynamic pricing component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the dynamic pricing component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
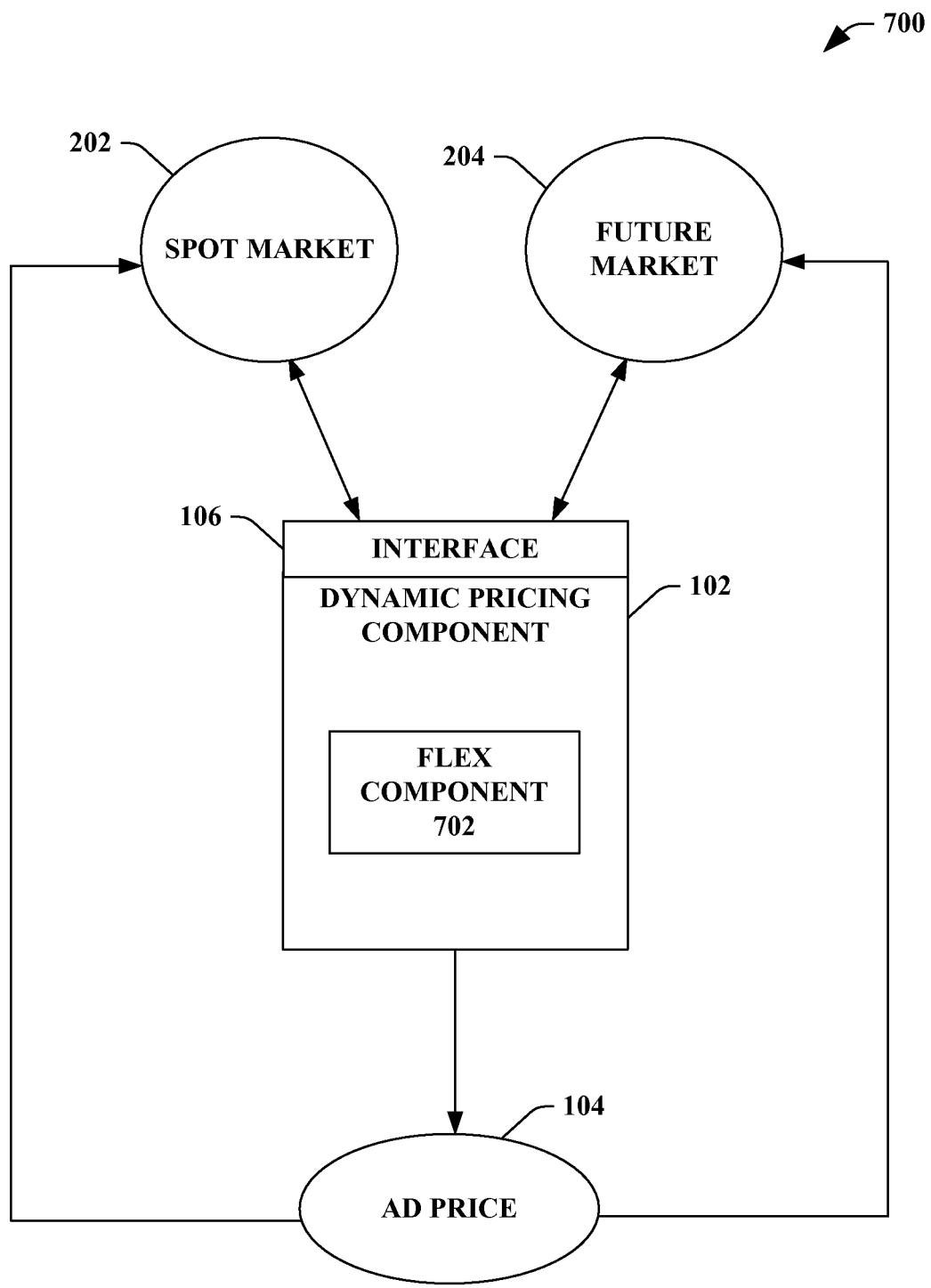
FIG. 7 illustrates a block diagram of exemplary systems that facilitates selling an advertisement associated with a website by allowing subtle manipulations and/or changes to the advertisement sale based on previous sales.

FIG. 7 illustrates a system 700 that facilitates selling an advertisement associated with a website by allowing subtle manipulations and/or changes to the advertisement sale based on previous sales. The system 700 can generate the ad price 104 which can be consistent with a market value and/or price associated with at least a portion of an ad unit, wherein the dynamic pricing component 102 can generate such ad price 104 by evaluating the spot market 202 and the future market 204. The dynamic pricing component 102 can establish the ad price 104 for the spot market 202 based upon evaluation of the future market 204 and vice versa. In particular, the ad price 104 can be a starting price for the spot market 202, while the ad price 104 can be a set price for the future market 204 (e.g., also referred to as a guaranteed market).

The dynamic pricing component 102 can include a flex component 702 that can implement subtle manipulations to a particular auction (e.g., within the spot market 202) and/or a negotiation (e.g., within the future market) in order to dynamically adapt to a constantly changing market(s). In particular, the spot market 202 and/or the future market 204 can be continuously changing, wherein particular ads, positions, durations, costs, measurements, etc. can be adapted in real-time in order to meet such demands with a rapidly changing market. In other words, the flex component 702 can evaluate current markets, past markets (e.g., historic data, etc.) which can be a basis to change a portion of a negotiation detail and/or auction detail to provide less rigidity than conventional ad selling techniques and/or traditional advertising platforms.

Figure 8:
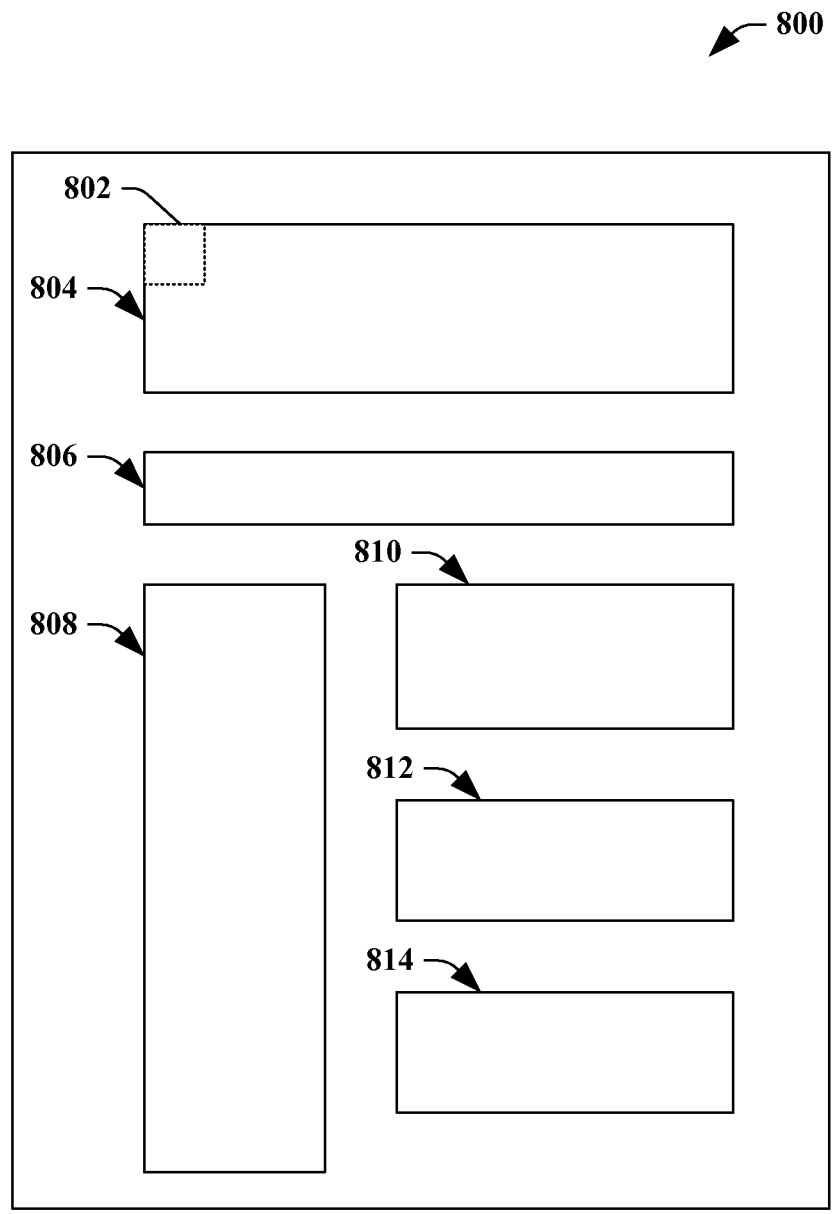
FIG. 8 illustrates a block diagram of an exemplary webpage including a portion of potential ad units to be sold at a determined price based on a market.

FIG. 8 illustrates a webpage 800 including a portion of potential ad units to be sold at a determined price based on a market. The webpage 800 can be an exemplary webpage, website, page, etc. that includes various groupings in specific positions as described previously. For instance, the webpage 800 can include most any suitable positions and/or groupings that can contain at least one potential ad unit 802. The webpage 800 can be partitioned and/or segregated into most any suitable number of groupings and/or positions in most any suitable configuration, location, etc. As illustrated, the webpage 800 is dissected into a first horizontal position 804, a second horizontal position 806, a left vertical position 808, a right top horizontal position 810, a right middle horizontal position 812, and a right lower horizontal position 812. Each position can include at least one potential ad unit such that the potential ad unit is the smallest segment for sale that can render a portion of an advertisement. Thus, each position can include multiple ads, each website can include multiple positions, and each webpage can include respective potential ad units and corresponding positions. For example, a website can include more than one webpage, wherein each webpage can include its own set of positions with potential ad units. Again for clarity, it is to be appreciated that most any suitable combination and/or grouping of potential ad units can be employed and the webpage 800 and depicted positions are for illustrative purposes only. Specifically, the claim subject matter can establish a current market price and/or value for a potential ad unit 802 within the first horizontal position 804 utilizing the spot market and/or the future/guaranteed market.

Figure 9:
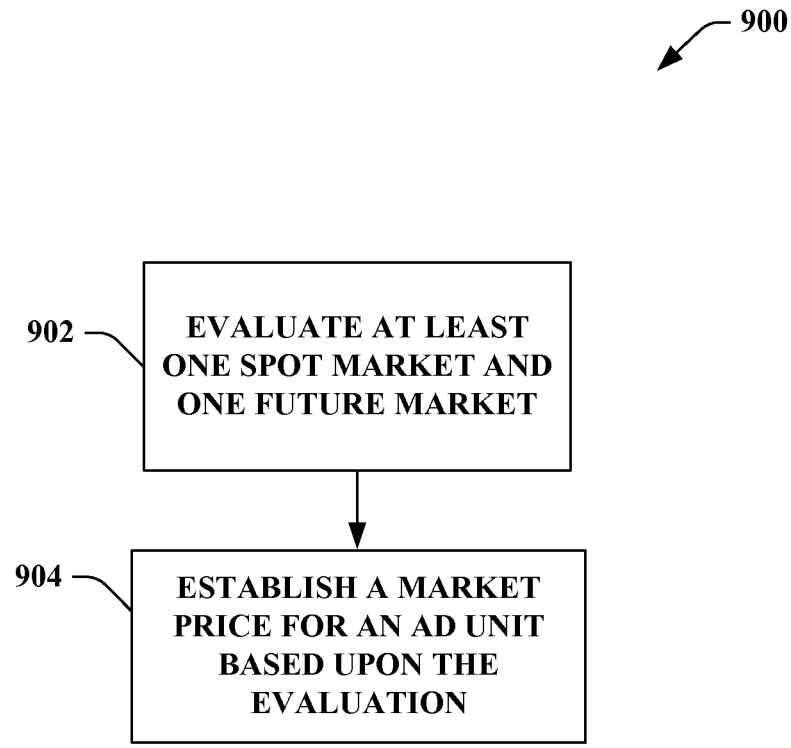
FIG. 9 illustrates an exemplary methodology that facilitates evaluating at least one market to identify a starting price for the purchase of an advertisement.
Figure 10:
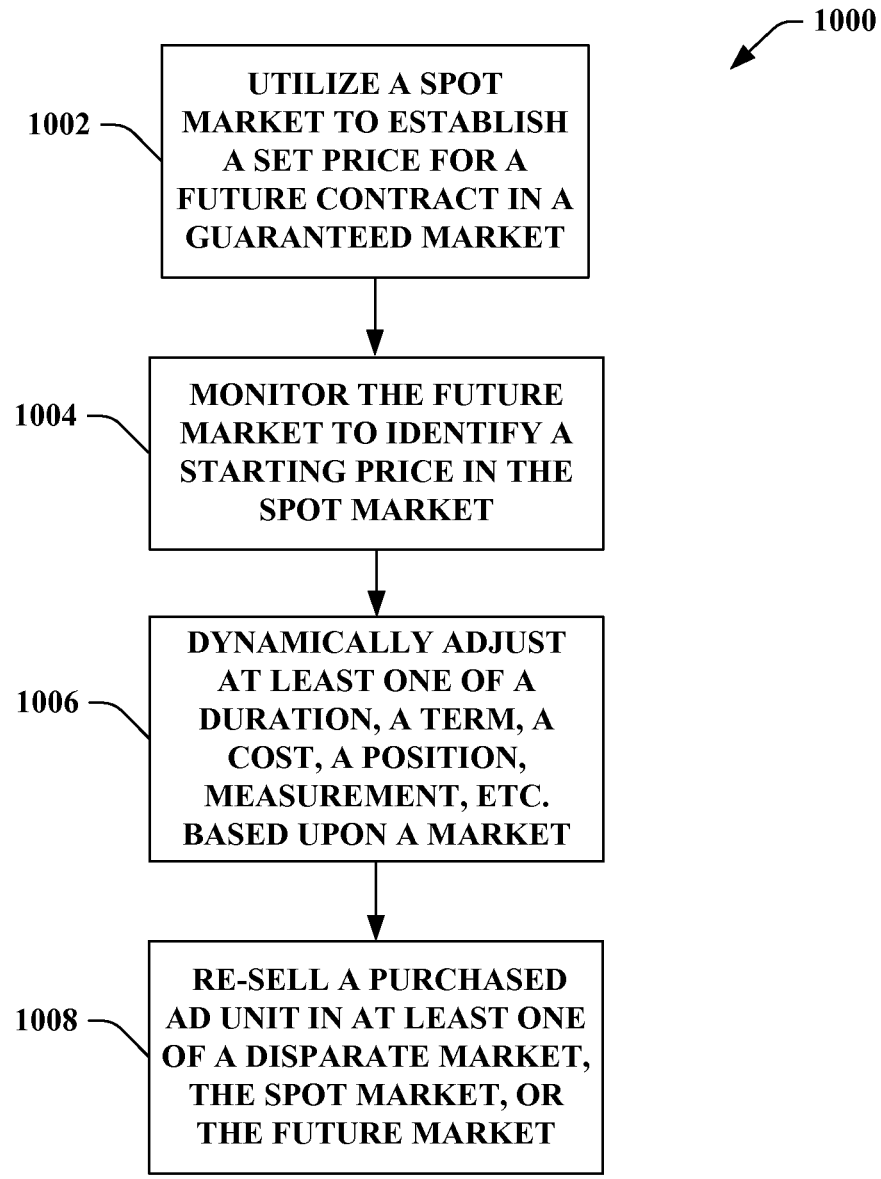
FIG. 10 illustrates an exemplary methodology for implementing a dynamic environment that enables the purchasing of an ad at a target price for distribution in a disparate market.

FIGS. 9-10 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 9 illustrates a methodology 900 that facilitates evaluating at least one market to identify a starting price for the purchase of an advertisement. At reference numeral 902, at least one spot market and one future market can be evaluated. In one example, the spot market can be an inventory for which the price is not deterministic or predictable. Auction bidding for a product is an example of spot market inventory. In contrast, the future market (also referred to as the guaranteed market) can be an inventory for which the seller is guaranteeing the conditions of sale, potentially at a lower price, for the certainty offered by the immediate sale of the item to the customer. The methodology 900 can utilize most any suitable technique and/or mechanism to evaluate bids, prices, ads, ad details, purchasers, sellers, dates, contract terms, etc. related to the spot market and/or the future market. For example, a price and specifics of an ad unit can be evaluated in order to establish a set price and/or starting price for later and/or concurrent use.

At reference numeral 904, a market price can be established for an ad unit based upon the evaluation. In other words, the market price can be dynamically identified based on the events associated with the spot market and/or the future/guaranteed market. The market price established can be associated with most any suitable portion of a potential ad unit, wherein the potential ad unit can be the smallest unit related to an advertisement that can be utilized and/or sold by a publisher. The ad unit can be a specific location on a page and/or website that an ad can be rendered. In other words, the potential ad unit can relate to a website, webpage, etc. that can be sold to advertise a particular item, good, service, a disparate ad, any suitable entity related to commerce, and/or any suitable combination thereof. Furthermore, the ad price can relate to most any suitable amount, group, bundle, and/or number of the potential ad units. For example, a publisher can sell a percentage of potential ad unit(s) and/or a fixed amount of such potential ad unit(s). Still further, the potential ad unit can relate to most any suitable position on the website, webpage, page, etc. Accordingly, each ad with respective position can include a particular price ascertained.

For example, the data related to a spot market and a future/guaranteed market can be evaluated in order to establish an ad price for a particular potential ad unit. In particular, the spot market data can be utilized to identify a suitable ad price for the future/guaranteed market and vice versa. In other words, a continuous auction (e.g., a spot market) can be combined with a fixed contract negotiation (e.g., a guaranteed/futures market) in order to generate the ad price consistent with the current market and/or demand associated with the particular portion of advertisement. By utilizing a spot market with a future/guaranteed market to establish the ad price and vice versa (e.g., utilizing a future/guaranteed market to establish the ad price), the portion of advertisement and/or potential ad unit can be sold with an accurate depiction of the true value within the market in real-time.

FIG. 10 illustrates a methodology 1000 that facilitates implementing a dynamic environment that enables the purchasing of an ad at a target price for distribution in a disparate market. At reference numeral 1002, a spot market can be utilized to establish a set price for a future contract in a guaranteed/future market. The spot market can be evaluated in order to establish a set price for which future and/or guaranteed market can begin contract negotiations. Such set price can correspond to an advertisement demand for such particular potential ad unit (and/or substantially similar ad unit, disparate percentage of use for the ad unit, etc.) in respect to commerce, commercial practice, and/or economic theories. At reference numeral 1004, the future market can be monitored to identify a starting price in the spot market. The starting price can be utilized as the starting bid price associated with an auction and/or the spot market. The starting price can also correspond to an advertisement demand for such particular potential ad unit (and/or substantially similar ad unit, disparate percentage of use for the ad unit, etc.) in respect to commerce, commercial practice, and/or economic theories.

At reference numeral 1006, at least one of a duration, a term, a cost, a position, a measurement, etc. can be dynamically adjusted based upon a market. In other words, the details associated with the sale of a portion of a potential ad unit can be dynamically adjusted and/or manipulated in real-time in order to react to a constantly changing market (e.g., the spot market, the future market, the guaranteed market, etc.). For instance, the duration of a fixed contract can be adjusted such that the duration can be updated and/or changed (during the life of the contract, at the expiration of the contract, etc.) in regards to yearly, bi-annually, monthly, quarterly, weekly, daily, hourly, by the minute, etc. The price of a future contract can also be adjusted during the life of the contact and/or at the end of the contract life. Generally, most any suitable term, detail, measurement (e.g., a fractional rotation for the advertisement, a cost/price per click (CPC), a price per 1000 impressions (CPM), a price per N impression (where N is a positive integer), and/or most any suitable unit of measurement related to the sale of a portion of a potential ad unit), etc. can be dynamically adjusted and/or manipulated.

At reference numeral 1008, a purchased ad unit can be re-sold in at least one of a disparate market, the spot market, or the future market. The potential ad unit can be purchased in at least one of the spot market and/or the future market at the ad price, wherein the purchased ad unit can be re-sold a market with most any suitable combination, grouping, bundling, partitioning, etc. It is to be appreciated that the re-sell can be employed by most any suitable entity such as, but not limited to, a third-party, a service, a network, a portion of a service, a server, a component, a machine, and/or any suitable combination thereof.

Figure 11:
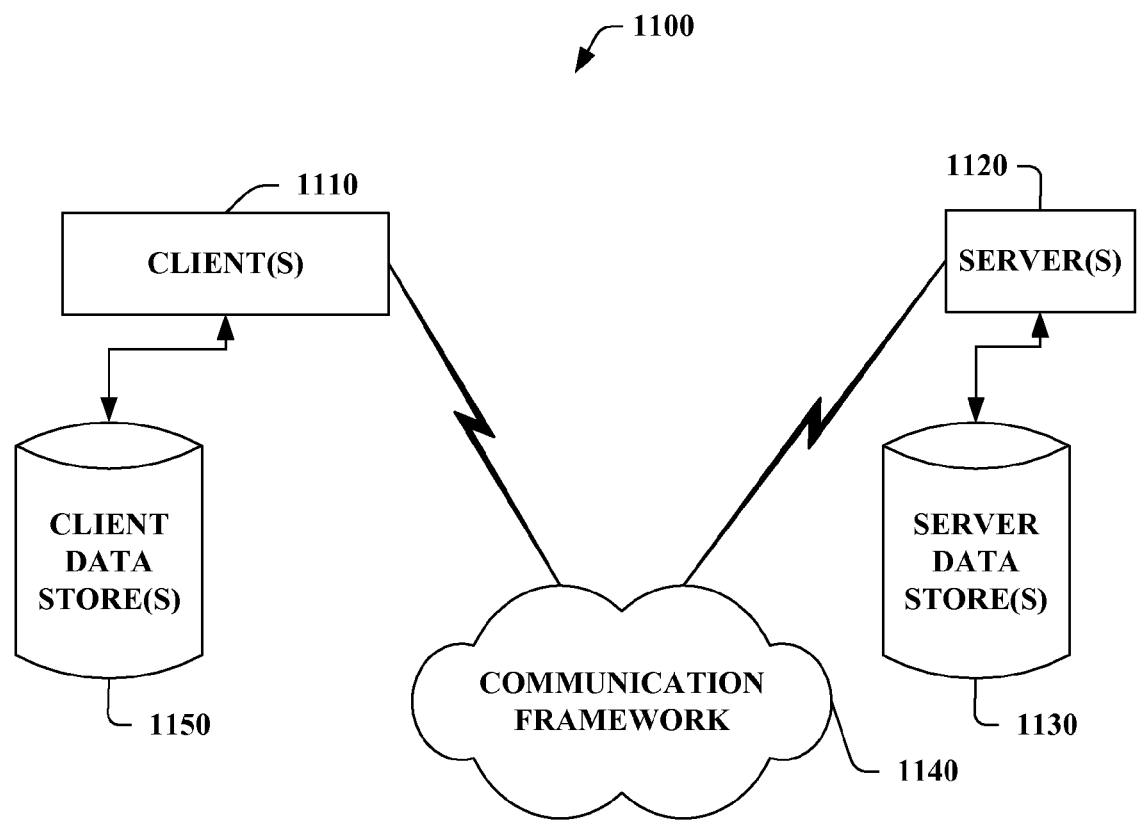
FIG. 11 illustrates an exemplary networking environment, wherein the novel aspects of the claimed subject matter can be employed.
Figure 12:
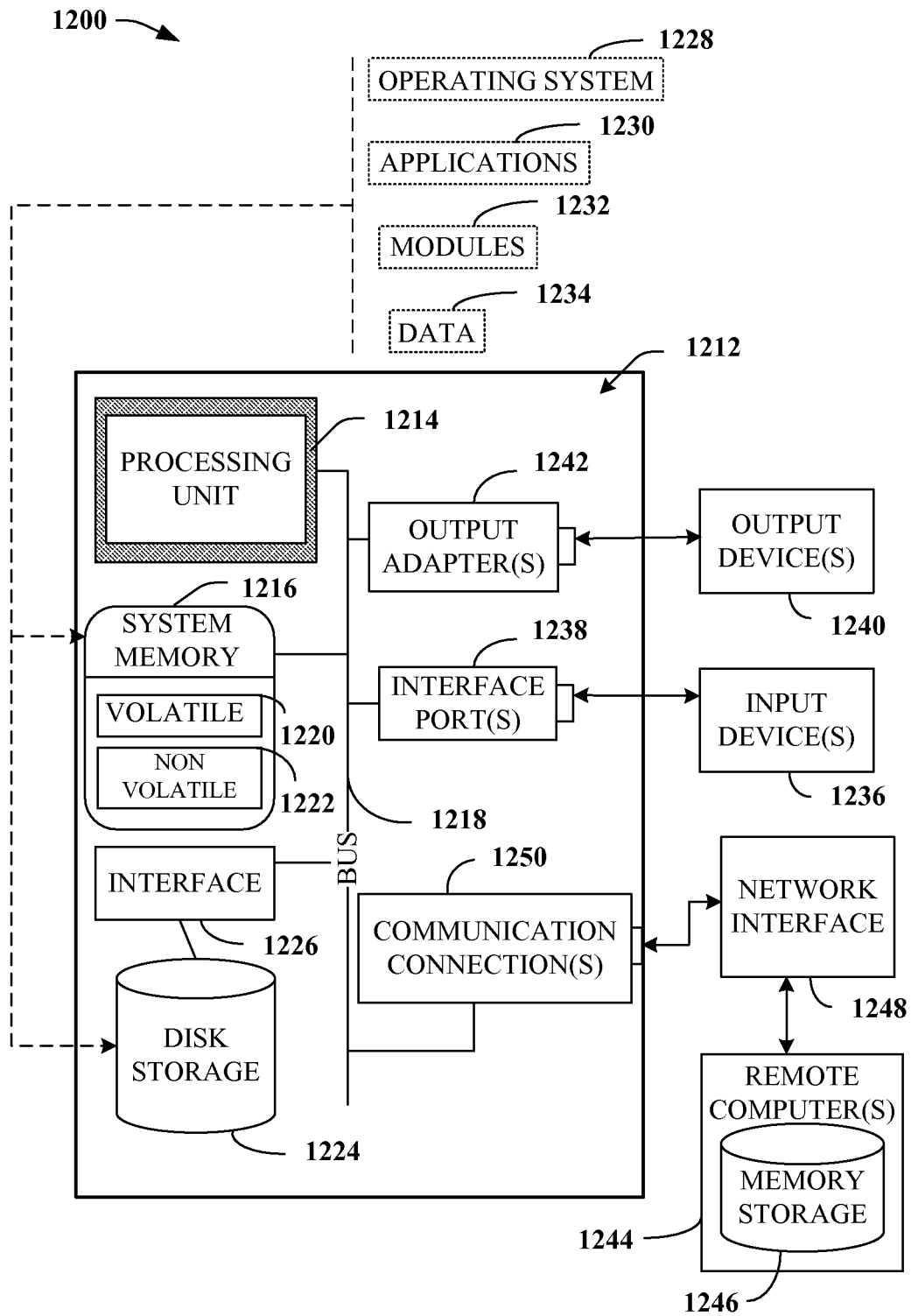
FIG. 12 illustrates an exemplary operating environment that can be employed in accordance with the claimed subject matter.

In order to provide additional context for implementing various aspects of the claimed subject matter, FIGS. 11-12 and the following discussion is intended to provide a brief, general description of a suitable computing environment in which the various aspects of the subject innovation may be implemented. For example, a dynamic pricing component that facilitates establishing an advertisement price based at least in part upon a spot market and a future/guaranteed market, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1120.

With reference to FIG. 12, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for establishing a true market value for an online advertisement, comprising:
    employing a processor executing computer executable instructions embodied on a computer readable storage medium to perform the following acts:
    receiving data related to a guaranteed price for ad units in a future market and prices for ad units in a spot market;
    identifying ad sales within the data that are similar to an ad unit that a publisher is making available to advertisers in the spot market and the future market using a machine classifier that maps attributes of the ad sales to attributes of the ad unit, wherein attributes include ad position;
    establishing a starting ad price for an ad unit in the spot market based upon the data related to the guaranteed price for the ad units received from the future market by employing a probabilistic analysis that infer the starting ad price using a support vector machine that generates a computation of a probability distribution for different starting prices based on consideration of the data related to the future market; and
    establishing a guaranteed ad price for the ad unit in the future market based upon the data.

2. The method of claim 1, wherein the ad unit in the spot market is utilized by a publisher to sell advertising, and is the smallest unit of the advertisement that can be rendered.

3. The method of claim 1, wherein the starting ad price and the guaranteed ad price are for the ad unit in a specific location on at least one of a website, a webpage, a page, or a site.

4. The method of claim 1, wherein a measurement of the price for the ad unit is at least one of a percent rotation for the advertisement, a cost/price per click (CPC), a price per 1000 impressions (CPM), a price per N impression, where N is a positive integer, or a unit of measurement related to sale of a portion of the ad unit.

5. The method of claim 1, wherein the starting ad price relates to at least one of an amount, a group, a bundle, an advertiser plurality, a user popularity, a vertical value, or a number of the ad unit.

6. The method of claim 1, wherein the spot market relates to selling at least one of a portion or a percent impression of the ad unit in the spot market online in a non-predictable and indeterminist environment.

7. The method of claim 6, wherein the spot market is at least one of an auction, a Vickrey auction, a Dutch auction, a second price auction, or a mixed goods auction.

8. The method of claim 1, wherein the future market is a guaranteed market that guarantees at least one condition of sale for the certainty offered by an immediate sale of the ad unit in the future market to a customer.

9. The method of claim 1, wherein the future market price is identified with at least one of a publisher set price, a price set from a market driven approach, a Vickrey auction, an auction, a Dutch auction, a second price auction, a lottery, a mixed goods auction, or a technique to ascertain a set price for the future market.

10. The method of claim 1, further comprising:
identifying at least one ad sale within the future market similar to the ad unit in the spot market to establish the starting ad price.

11. The method of claim 1, further comprising automatically adjusting a time period associated with renewal of an ad sale contract within the future market based upon a current market state based upon the received data related to at least one of the spot market or the future market, wherein a price of the ad sale contract is not changed with the renewal.

12. The method of claim 1, further comprising purchasing a portion of the ad unit in the spot markets at the starting ad price in order to re-sell at least a fraction of the portion of the ad unit in at least one of a disparate market, the spot market, or the future market.

13. The method of claim 1, further comprising dynamically implementing a change to an auction within the spot market based upon the received data related to the future market, wherein the change is at least one of an ad unit position, a contract duration, or a contract ad unit measurement.

14. A method that facilitates generating a price for a portion of an online advertisement, comprising:
employing a processor executing computer executable instructions embodied on a computer readable storage medium to perform the following acts:
evaluating at least one spot market and one future market by employing a probabilistic analysis that infers the starting ad price using a support vector machine that generates a computation of a probability distribution for different prices based on consideration of the data related to the future market and the spot market;
automatically apportioning an inventory of a plurality of ad units based upon the evaluation for a publisher, wherein a subset of the inventory is apportioned to the spot market and a subset of the inventory is apportioned to the future market; and
generating a set price for the inventory apportioned to the future market and a starting price for the inventory apportioned to the spot market based at least in part upon the evaluation.

15. The method of claim 14, further comprising:
monitoring one or more bids for the inventory apportioned to the spot market; and
dynamically adjusting the set price for the inventory in the futures market based upon the monitored one or more bids.

16. The method of claim 14, further comprising dynamically adjusting a duration of a contract for a subset of the inventory in the futures market based upon the monitored one or more bids.

17. One or more computer-storage hardware devices having computer-executable instructions embodied thereon that when executed by a computing device facilitates establishing a true market value for an online advertisement, comprising:
receiving data related to at least one of a spot market or a future market;
indentifying at least one sale within the spot market for an ad unit similar to an ad unit in the future market using a machine classifier that maps attributes of the at least one sale to attributes of the ad unit;
automatically apportioning an inventory of a plurality of ad units based upon the data, wherein a subset of the inventory is apportioned to the spot market and a subset of the inventory is apportioned to the future market;
dynamically establishing a set ad price for the ad unit in the future market based upon a sale price for the identified at least one ad sale within the spot market by employing a probabilistic analysis to infer the set ad price for the ad unit in the future market using a support vector machine that generates a probability distribution for different set ad prices based on ad sales within the spot market; and
consummating transactions for the ad units in both the spot market and the future market based on the apportionment.

* * * * *